United States Patent [19]

Hewgley, Jr. et al.

[11] 3,851,155

[45] Nov. 26, 1974

[54] PHASE DISPLACEMENT DETECTION SYSTEM

[75] Inventors: Robert E. Hewgley, Jr., Oak Ridge, Tenn.; Michael S. Tuckman, Gales Ferry, Conn.

[73] Assignee: The United States of America as repesented by the United States Atomic Energy Commission, Washington, D.C.

[22] Filed: June 6, 1973

[21] Appl. No.: 367,682

[52] U.S. Cl. ........ 235/92 PS, 235/92 R, 235/92 LG, 235/92 GC
[51] Int. Cl. ............................................. G06m 3/02
[58] Field of Search .......... 235/92 T, 92 AC, 92 PS, 235/92 LG

[56] References Cited
UNITED STATES PATENTS

| | | | |
|---|---|---|---|
| 3,610,895 | 10/1971 | Wollesen | 235/92 T |
| 3,686,634 | 8/1972 | Malchman | 235/92 T |
| 3,748,580 | 7/1973 | Stevens | 235/92 T |

*Primary Examiner*—Gareth D. Shaw
*Assistant Examiner*—Robert F. Gnuse
*Attorney, Agent, or Firm*—John A. Horan; David S. Zachry; David E. Breeden

[57] ABSTRACT

A phase displacement detection circuit has been provided which continuously monitors the phase displacement between a pair of input signals. This circuit is particularly useful in combination with a numerically controlled machine which employs redundant position sensing feedback systems such as a resolver feedback and an interferometer feedback system to increase machining accuracy. The error detection circuit employs a digital discriminator for comparison of the phase relationship between the resolver feedback and the interferometer feedback signals. At the time of first detection of either feedback signal, a counter is triggered "on" to count clock pulses and subsequently turned "off" and reset to the zero state at the time of detection of the other feedback signal. The elapsed time between the detection of the two feedback signals and, therefore, the number of counts accumulated in the counter, is a direct measure of the error between the two systems. By selecting a particular count output through selective gating circuitry connected to the counter, the system may be used to sound an alarm or shut down the machine when the selected count is exceeded, indicating an excessive error.

8 Claims, 1 Drawing Figure

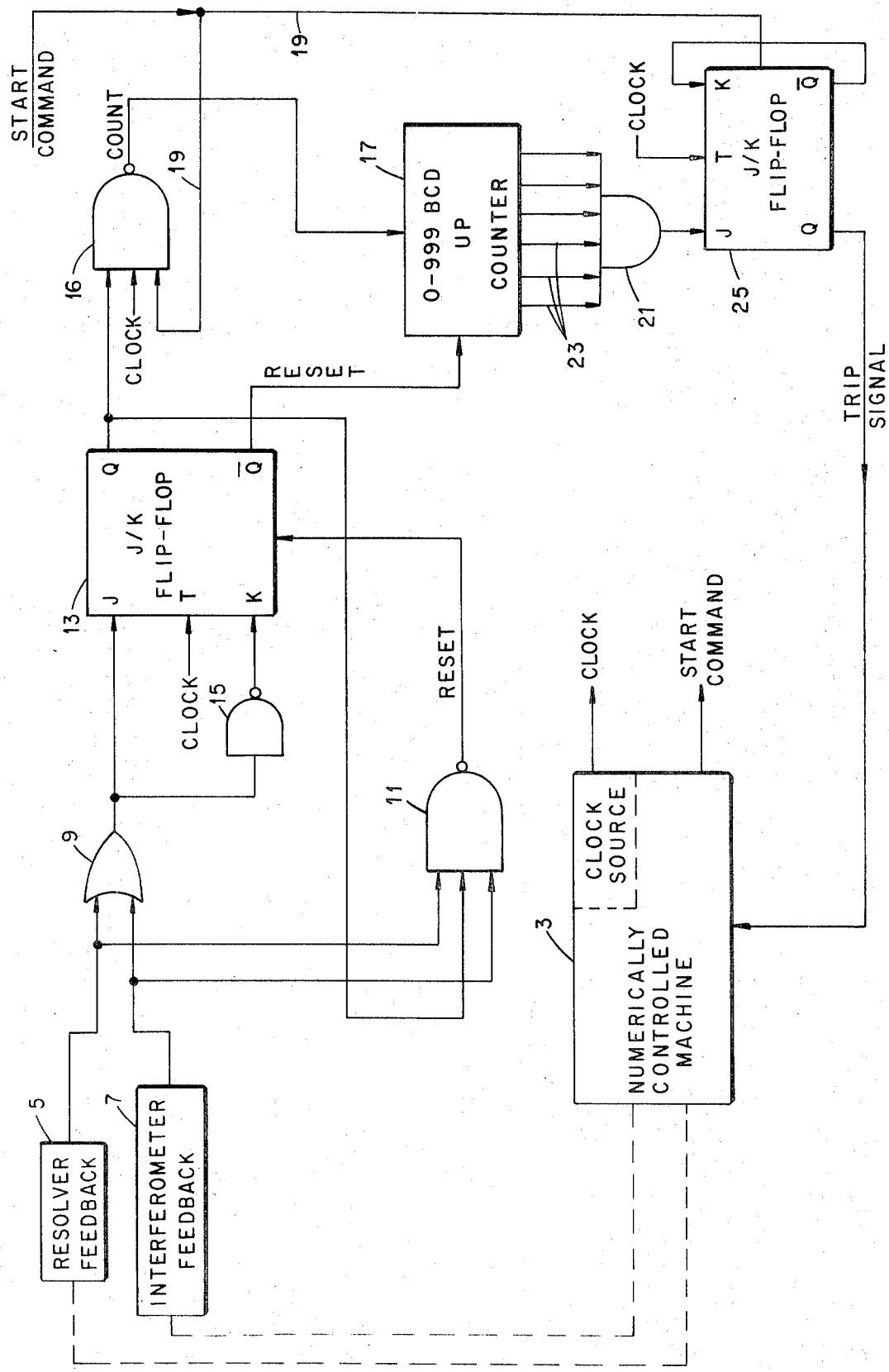

PHASE DISPLACEMENT DETECTION SYSTEM

BACKGROUND OF THE INVENTION

The present invention was made during the course of, or under, a contract with the United States Atomic Energy Commission.

The invention relates generally to multiple signal phase displacement detection systems and more specifically to protection circuitry for detection of phase displacement errors in redundant feedback systems for numerically controlled (NC) machines.

Machine tool control systems utilize phase sensitive wavetrains for determining the error between the commanded and actual position of the slides. Command pulses are utilized to phase shift the output of a counter with respect to a reference waveform which is related to the basic clock frequency of the control unit. The reference Wavetrain traditionally excites one winding of a resolver and the phase of the output signal is dependent on the rotary position of the second winding. This phase sensitive output signal is utilized as the position feedback signal to the control unit. The difference in phase between the commanded wave and the feedback wave generates an error signal for the analog servo loop. Recently, the adaptation of laser interferometers as position feedback elements has led to redundant feedback control loops, that is, a sophisticated machine tool may incorporate both a conventional resolver feedback system and a laser interferometer feedback system.

Both of these feedback systems utilize output wavetrains which are of the same form or are functionally identical. The control unit must also monitor the command wave and the feedback wave for phase shifts greater than 360°. An excess counter is utilized for this function.

The loss of the position feedback signals on machine tool slides has resulted in uncontrolled travel at maximum rates of the slides and subsequent damage to the machine and irreparable part damage. In most cases this occurs before sufficient error from the excess error counter can effect a machine shutdown. The limits which determine when the excess counter can trigger a shutdown must be high because the error between the commanded and actual positions increases with increasing velocity.

Systems utilizing the laser interferometer feedback signals are especially vulnerable because of accidental beam blockage, untuned laser cavity, dirty optics, and interferometer failure. In practice, no means are available for protection from marginal operating conditions, as, for example, when a laser beam intensity drifts below the detectable level.

What has been provided by this invention is a new phase displacement monitoring circuit which may be utilized with an NC machine where redundant feedback systems are employed to monitor the phase displacement error between the two feedback signals. It operates on the principle that a maximum, definable total mechanical error exists between the two feedback systems, i.e., backlash, cyclic and length measuring errors.

SUMMARY OF THE INVENTION

In view of the above, it is an object of this invention to provide a system for monitoring the phase displacement between a pair of signals which generates an output signal when a preselected maximum phase displacement between the signals is detected.

Another object of this invention is to provide a system for monitoring errors in redundant feedback systems for numerically controlled machines and provide an output signal which may be used for machine shutdown when the error exceeds a selected limit.

Further, it is an object of this invention to provide a system for use with a numerically controlled machine which monitors the phase difference between redundant feedback sensor signals and generates an output signal when the phase difference exceeds a selectable error limit.

Other objects and many of the attendant advantages of the present invention will be obvious from the following detailed description of the preferred embodiment taken in conjunction with the drawing wherein the single FIGURE is a schematic block diagram of a phase displacement monitoring circuit according to the present invention shown in combination with an NC machine having both a resolver and interferometer feedback systems.

DETAILED DESCRIPTION

Referring now to the drawing, the circuit is depicted as applicable to an NC machine system 3 which includes a resolver feedback system 5 and a laser interferometer feedback system 7 for redundant position monitoring. The NC controlled machine 3, resolver 5 and interferometer 7 are conventional, well-known units and, therefore, need not be discussed here except as applicable to the present system described below.

The resolver feedback output and the interferometer feedback output are connected, respectively, to the first and second inputs of an OR gate 9, and correspondingly, to first and second inputs of a NAND gate 11. The output of OR gate 9 is connected to the set (S) input of a J-K flip-flop 13 and through an inverter 15 to the reset (R) input of flip-flop 13. Clock pulses from the machine control system clock are provided to the trigger input (T) of flip-flop 13. The set output (Q) of flip-flop 13 is connected to one input of a NAND gate 16 and to the third input of NAND gate 11. The output of gate 11 is connected to the direct reset input of flip-flop 13 so that when the output of NAND gate 11 is low, flip-flop 13 is held in the reset state. The reset output ($\overline{Q}$) of flip-flop 13 is connected to the reset input of a binary coded decimal "up" counter 17.

Electrical leads 19 that provide a start command signal are provided with one lead connected to a second input of NAND gate 16 which is connected to receive the system clock signal at a third input. The start command may be generated from an external switch (not shown) or from a delayed start signal from the control unit which is activated when the feedback signals are initially set in phase to prevent gate 16 from being enabled until the start command is initiated. The output of gate 16 is connected to the count trigger input of counter 17. Selected count stages of the counter 17, corresponding to the selected phase error count, are connected to corresponding inputs of an AND gate 21 through lines 23 so that, when the selected count is registered by counter 17, AND gate 21 is enabled, as will be explained in more detail hereinbelow.

The output of gate 21 is connected to the set input of another J-K flip-flop 25 which has its trigger input connected to receive the system clock pulses and its direct reset input connected to the start command line 19. The reset output ($\overline{Q}$) is connected to the reset input (R) which holds the R input high when in the reset state so that when the S input is high from gate 21 being enabled, a clock pulse will trigger flip-flop 25 to the set state, Q output high. The Q output of flip-flop 25 is then the alarm or trip signal output which indicates that the phase difference between the redundant feedback systems has exceeded a maximum value selected at the counter 17. The Q output of flip-flop 25 is connected to a trip control input of the NC machine 3.

Assuming that the resolver feedback 5 and laser feedback 7 outputs are initially in phase, at least within the error limit as set by the selected count in counter 17, a high state of either feedback wavetrain from either of the feedback systems or both will set the J input of flip-flop 13 high through OR gate 9 and the K input low through the action of inverter 15 so that the subsequent negative going edge of the clock pulse will set flip-flop 13, Q output high. If the resolver and interferometer signals are exactly in phase, all three inputs to NAND gate 11 will be high causing the output to go low, thereby resetting flip-flop 13 preventing counts from being registered by counter 17. If the feedback pulses are only slightly out of phase, i.e., within the maximum limit, the high on the Q output of flip-flop 13 will remain long enough to enable NAND gate 16 to gate clock pulses to the counter 17, assuming that the start command line 19 is activated. The counter will continue to register the clock pulses until the other feedback signal is generated, which as before resets flip-flop 13. When flip-flop 13 is reset the $\overline{Q}$ output applies a high to the reset input of counter 17, clearing the counter for the next count cycle.

If the feedback signals exceed the phase displacement which will allow the counter to register the maximum count and the selected stages for this count have been connected to AND gate 21, the gate 21 is enabled and applies a high to the J input of flip-flop 25 so that the negative going edge of the next clock pulse will cause flip-flop 25 to change stages to the set state causing the Q output to go high, indicating that the phase difference error has been exceeded. This output may be coupled to additional control circuitry (not shown) that generates emergency stops within the NC machine and initiates either a visible or audible alarm.

It will further be understood that the system will also monitor the phase displacement of the trailing edges of the pulse train in the same manner as described above. For example, assume that the resolver feedback 5 signal goes low first leaving the interferometer feedback 7 signal high, thereby enabling the counter 17 as above. The counter 17 will continue to count clock pulses until the interferometer signal goes low which changes the J and K inputs of flip-flop 13 through the action of gate 9 and inverter 15. Since the J input is now low and the K input is high and the output of NAND gate 11 remains high, flip-flop 13 will trigger on the next clock pulse to reset the counter 17.

Assuming that the trailing edge displacement count is within the error limit, the system continues to operate (no trip signal) and since all inputs to gate 11 are low at this point, its output remains high, thereby enabling flip-flop 13 to set when either of the feedback pulse trains goes high.

In order to determine which feedback system failed, the two signal leads may be checked with an oscilloscope for the presence or absence of a signal. When looking at these two signals, movement of the interferometer retroreflector will reveal if the laser signal is being shifted in phase with respect to the resolver signal as in normal operation. The shutdown condition is cleared only by the application of the start command signal on line 19 which is disabled when the shutdown occurs.

In practice, typically a maximum count of 100 registered by counter 17 at a clock frequency of 5 MHz is selected which corresponds to an error of about 5 mils slide displacement between the resolver and interferometer feedback indication. With machines having dual feedback systems on two or more axes of movement, a circuit of the subject invention would be utilized with each axis.

Thus, it will be seen that a feedback error detection system has been provided which is especially useful with an NC machine to protect the machine or workpiece from damage due to loss of one or excessive errors in the position sensing feedback systems.

Although the present invention has been described in connection with a particular embodiment, it is be understood that other embodiments and modifications will be obvious to those skilled in the art which will embody the priniciples of the invention and fall within the spirit and scope thereof as set forth in the following claims.

What is claimed is:

1. A device for monitoring the phase displacement of a pair of signals, comprising:

a counter having a count trigger input and a reset input;

a clock pulse source;

a first gating means having first and second inputs connected to receive respective ones of said pair of signals for generating a signal at an output thereof when the leading one of said pair of signals is detected;

a second gating means having an input connected to said clock pulse source, at least one enabling input connected to the output of said first gating means, and an output connected to said count trigger input of said counter for gating clock pulses to said counter when enabled by said signal from said first gating means;

a third gating means having first, second, and third inputs, said first and second inputs of said third gating means connected to receive respective ones of said pair of signals and said third input of said third gating means connected to the output of said first gating means for resetting said counter when the trailing one of said pair of signals is detected; and an output circuit means for detecting a preselected maximum count of clock pulses registered by said counter and generating an output signal indicative of an excess phase displacement of said pair of signals as determined by said preselected count being registered by said counter between the time of detection of said leading one and said trailing one of said pair of signals.

2. A phase displacement monitoring device as set forth in claim 1 wherein said first and third gating means include an OR gate having first and second inputs connected to receive respective ones of said pair of signals; a flip-flop having a toggle input connected to said clock pulse source, at least one enabling input connected to the output of said OR gate, a set output connected to said second gating means, a reset output connected to said reset input of said counter and a direct reset input; a NAND gate having first and second inputs connected respectively to receive said pair of signals, a third input connected to the set output of said flip-flop and an output connected to said direct reset input of said flip-flop.

3. A phase displacement monitoring device as set forth in claim 2 wherein said flip-flop is a J/K flip-flop having its J input connected to the output of said OR gate and wherein said first gating means further includes an inverter connected between the output of said OR gate and the K input of said J/K flip-flop.

4. The phase displacement monitoring device as set forth in claim 3 wherein said counter is a binary coded decimal counter and wherein said output circuit means includes a fourth gating means having a plurality of inputs connected to selected stages of said counter which are activated when said maximum count is registered so that a signal is generated at the output of said fourth gating means when each of said plurality of inputs thereof is activated.

5. In combination with a numerically controlled machine wherein the control system includes a first and second position sensing feedback system for controlling the position of a positionable member, a device for monitoring the phase displacement of the pair of signals respectively produced by said first and second feedback systems, comprising:

a counter having a count trigger input and a reset input;

a clock pulse source;

a first gating means having first and second inputs connected to receive respective ones of said pair of signals for generating a signal at an output thereof when the leading one of said pair of signals is detected;

a second gating means having an input connected to said clock pulse source, at least one enabling input connected to the output of said first gating means, and an output connected to said count trigger input of said counter for gating clock pulses to said counter when enabled by said signal from said first gating means;

a third gating means having first, second, and third inputs, said first and second inputs of said third gating means connected to receive respective ones of said pair of signals and said third input of said third gating means connected to the output of said first gating means for resetting said counter when the trailing one of said pair of signals is detected; and an output circuit means for detecting a preselected maximum count of clock pulses registered by said counter and generating an output signal indicative of an excess phase displacement of said pair of signals as determined by said preselected count being registered by said counter between the time of detection of said leading one and said trailing one of said pair of said signals.

6. The combination as set forth in claim 5 wherein said first and third gating means include an OR gate having first and second inputs connected to receive respective ones of said pair of signals; a flip-flop having a toggle input connected to said clock pulse source, at least one enabling input connected to the output of said OR gate, a set output connected to said second gating means, a reset output connected to said reset input of said counter and a direct reset input; a NAND gate having first and second inputs connected respectively to receive said pair of signals, a third input connected to the set output of said flip-flop and an output connected to said direct reset input of said flip-flop.

7. The combination as set forth in claim 6 wherein said flip-flop is a J/K flip-flop having its J input connected to the output of said OR gate and wherein said first gating means further includes an inverter connected between the output of said OR gate and the K input of said J/K flip-flop.

8. The combination as set forth in claim 7 wherein said counter is a binary coded decimal counter and wherein said output circuit means includes a fourth gating means having a plurality of inputs connected to selected stages of said counter which are activated when said maximum count is registered so that a signal is generated at the output of said fourth gating means when each of said plurality of inputs thereof is activated, the output of said fourth gating means being connected to a trip control input of said numerically controlled machine.

* * * * *